No. 873,991. PATENTED DEC. 17, 1907.
W. R. CUNNINGHAM.
UNLOADING MECHANISM.
APPLICATION FILED SEPT. 16, 1907.

2 SHEETS—SHEET 1.

Witnesses
C. H. Hacker.
C. W. Fowler.

Inventor
William R. Cunningham.
By J. Walter Fowler
his Attorney

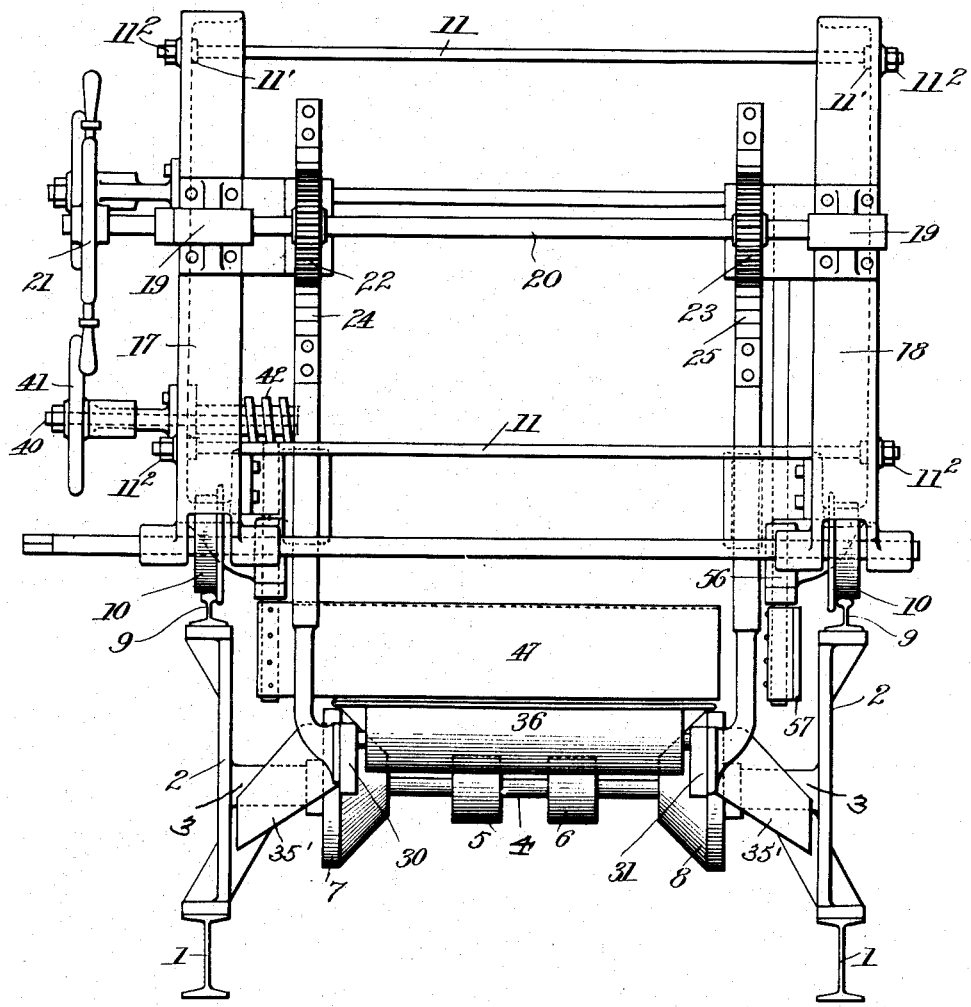

UNITED STATES PATENT OFFICE.

WILLIAM R. CUNNINGHAM, OF BUCYRUS, OHIO, ASSIGNOR TO THE AMERICAN CLAY MACHINERY COMPANY, OF BUCYRUS, OHIO, A CORPORATION.

UNLOADING MECHANISM.

No. 873,991.   Specification of Letters Patent.   Patented Dec. 17, 1907.

Application filed September 16, 1907. Serial No. 393,030.

*To all whom it may concern:*

Be it known that I, WILLIAM R. CUNNINGHAM, a citizen of the United States, residing at Bucyrus, in the county of Crawford and State of Ohio, have invented new and useful Improvements in Unloading Mechanism, of which the following is a specification.

This invention relates to certain new and useful improvements in unloading mechanism wherein means are employed for removing loose material carried by a belt-conveyer, and delivering said material to either or both sides of the conveyer.

Primarily my invention is designed for handling wheat, corn, clay, coal and other like loose material from a traveling belt-conveyer at any intermediate point in the length thereof, and to remove part of the material on one side and part on the other, or all on either side, as desired, such device being technically known in this art as a "tripping device".

The invention consists of the parts and the construction, arrangements and combinations of parts which I will hereinafter describe and claim.

Figure 1:
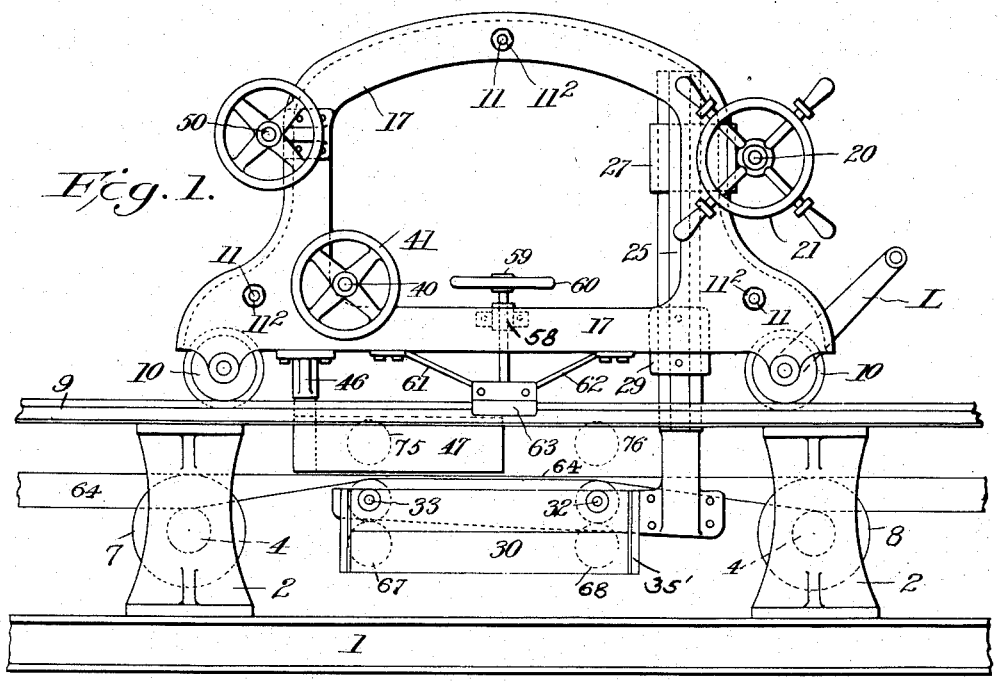
Figure 2:
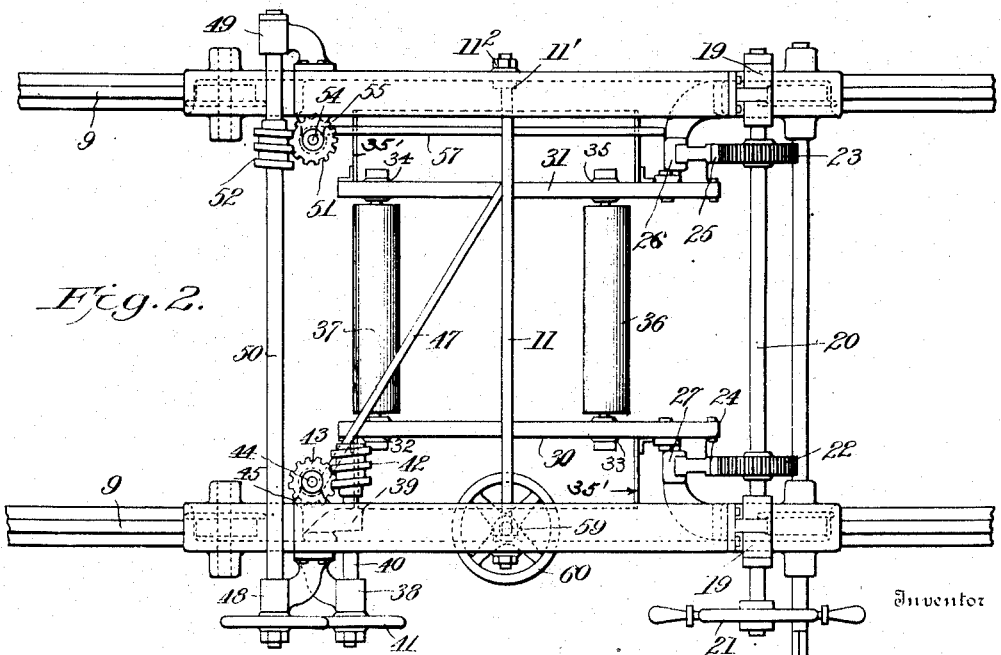

In the accompanying drawings forming part of this specification and in which similar reference characters indicate like parts in the several views,—Figure 1, is a side illustration of an unloading mechanism embodying my invention. Fig. 2, is a top plan view of Fig. 1. Fig. 3, is an end elevation.

In carrying out my invention I have shown the same associated with an appropriate frame-work or supporting structure wherein I-beams, 1, or like parts form the main members of the base, to which beams the lower ends of suitable uprights, 2, are bolted or otherwise secured. These uprights are in practice spaced apart from substantially one end of the conveyer to the other. The upper ends of the uprights support an elevated guide or track including the rails, 9, upon which my unloading or tripping mechanism is mounted and over which it is movable from point to point along the conveyer-belt, said guide or track being arranged substantially parallel with the conveyer and above the same as shown in Fig. 1. This conveyer is intended to represent any of the usual and well known forms used for conveying such loose material as before mentioned. For purposes of simplicity and convenience the conveyer may be a common traveling belt of canvas, leather, or other appropriate material of suitable width and of such length as may be required, said belt being adapted to travel over and be supported by rollers or pulleys, 5 and 6, fixed to shafts, 4, whose ends are journaled in bearings, 3, on the inner sides of the uprights.

Loose on the shafts, 4, outside the pulleys, 5 and 6, are cone-pulleys, 7 and 8, and upon these cone-pulleys and the plain pulleys, 5 and 6, the upper run of the conveyer-belt is supported with its side edges engaged by the cone-surfaces of the outside pulleys, 7 and 8, whereby said edges are curved upwardly to impart substantially a transversely curved or trough-shape to the belt, for holding or confining the material on the belt while it is being conveyed from one point to another.

Upon the guide or track, 9, before mentioned, a wheeled or movable carriage having my unloading mechanism is designed to travel and to be fixedly secured, when desired, as when unloading the material from the belt, said carriage including in its construction suitable side frames, 17 and 18, with rollers, 10, or equivalent guides at the lower corners engaging the rails of the aforesaid track or guide.

That the side frames, 17 and 18, may be appropriately spaced apart and securely and rigidly held, I employ suitable distance pieces or tie-rods, 11, having collars, 11', forming shoulders for the side frames to rest against, said rods being suitably secured by nuts, 11².

Appropriate journal bearings, 19, are bolted or otherwise secured to the side frames, 17 and 18, and receive the journal portions of a transverse shaft, 20, on one end of which is secured a hand-wheel, 21, by which said shaft may be turned.

Keyed or otherwise fixed to opposite portions of the shaft, 20, between the side frames, 17 and 18, are gear wheels, 22 and 23, which are in mesh with rack bars, 24, and 25, vertically disposed and slidable in guides, 26, 27, 28 and 29, the lower ends of the rack bars being formed or provided with flanges to which are bolted suitable parallel longitudinal arms, 30 and 31, which are drilled to form bearings, 32 and 33, and 34 and 35, for receiving the journals of the rollers, 36 and 37, which extend transversely beneath the upper run of the conveying belt and are designed to engage and lift the belt from below to remove it from the cone-shaped pulleys, 7 and 8, and straighten said belt out transversely for a purpose I will presently describe. Suitable chutes, 35 and 35', are also secured to the parallel longitudinal arms, and direct outwardly beyond the belt the material discharged laterally over the edges thereof.

As shown in Fig. 2, I bolt or otherwise secure to one of the side frames, 17, the hangers, 38 and 39, which support the short transverse shaft, 40, having at one end a hand-wheel, 41, and having at the opposite end a worm, 42, which meshes with a worm-gear, 43, on a vertical shaft, 44, mounted in journal bearings, 45 and 46, bolted or otherwise fixed to the side frame, 17, the lower end of said vertical shaft having fixed to it a wing-scraper or blade, 47, which is turnable in a horizontal plane and is designed to be moved into the range of action of the material on the conveyer-belt to direct a part or all of the material being conveyed, outwardly over the edge of the belt and into the chute on that side of said belt.

The side frames, 17 and 18, also have bolted to them suitable journal-bearings, 48 and 49, in which the opposite journal-portions of a transverse shaft, 50, are mounted, said shaft having a hand-wheel at one end and having a worm, 52, fixed to it near the opposite end and adapted to mesh with a worm-gear, 51, which is mounted on a vertical shaft, 54. This shaft is supported in bearings, 55 and 56, which are secured to the other side frame, 18, and to the lower end of said shaft is secured a wing-scraper or blade, 57, which is located near the edge of the conveyer belt opposite to that where the other scraper or blade is located.

The side frame, 17, also has secured to it a bearing, 58, which is internally threaded to form a nut to operatively engage with a vertically-disposed screw, 59, having a hand-wheel, 60, fixed to its upper end; and to the under side of said frame, 17, suitable hangers, 61 and 62, are bolted, said hangers having their inner ends attached to a shoe, 63, which is disposed over and proximate to a track rail, 9, and is designed to engage or clamp the same as a track brake and thereby hold the carriage at any desired point or station along the conveying belt.

A lever or crank, L, fixed to one of the main bearing wheel shafts of the carriage serves as a means for moving the carriage from one place to another.

The operation of my unloading mechanism is substantially as follows:—The material to be conveyed, whatever its character, is received upon the belt-conveyer from any suitable source of supply, and carried to any station, bin, or portion of the building or other point where it is desired to remove the material from the belt, at which point of discharge the carriage with its unloading features has been moved and secured. By turning the hand-wheel, 21, in one direction, the rack-bars, 24 and 25, are, through the medium of the shaft, 20, and pinions, 22 and 23, caused to move upwardly in their guides thereby also raising the parallel longitudinal bars, 30, 31, the chutes, 35 and 35', and the rollers, 36 and 37, these bars forming an elevating frame for the rollers and the chutes. During this operation, the rollers, 36 and 37, engage the upper run of the belt from below and lift this portion of the belt immediately below the carriage from off the cone-pulleys, 7 and 8, and thereby cause the former transversely-curved or trough-shape of this part of the belt to be destroyed or changed to a flat level surface for the scrapers, 47 and 57, to operate over to direct the material transversely over one or both edges of said belt, as may be desired, and into the delivery chute or chutes. The same features permit the rollers, 36 and 37, and arms 30 and 31, to be lifted high enough, say to the dotted position, 75 and 76, in Fig. 1, to safely and unobstructedly pass over the cone-pulleys, 7 and 8, without removing the rollers, 36 and 37, when moving the carriage from one position to another along the length of the conveying belt. The rack and operating devices also permit the scrapers to be elevated to accommodate the adjustment of the parts just described. The unloading devices can, therefore, be located at any station, bin, or portion of the building desired where the material is to be unloaded, or removed from the belt. The hand-wheel, 21, and the before described associated parts, also afford means for lowering the bars, 30 and 31, to the position shown by dotted lines, 67 and 68, in Fig. 1, thereby allowing the belt, 64, to rest upon the cone-pulleys and resume its transversely curved or trough-shape, and the material to pass undisturbed under the carriage and the unloading devices to the end of the belt, whenever it is desired to do so.

By means of the hand-wheel, 41, shaft, 40, worm, 42, and worm-gear, 43, the vertical shaft, 44, may be turned to position the wing-scraper, 47, diagonally across the belt to direct all of the material to one side and into the chute, 35. If it is desired to discharge all of the material over the other side or edge of the belt, the wing-scraper is turned by the aforesaid parts, to assume a position parallel with the travel of the belt, and the other scraper, 57, by means of the hand-wheel, 51, shaft 50, worm, 52, and worm-gear, 53, and the vertical shaft 54, is moved from the position shown in Fig. 2 to a position across the surface of the belt similar to, but the reverse of that shown by the scraper, 47, in said Fig.

2, when the material will be delivered into the chute on that side.

If it is desired to remove half of the material, more or less, and let the remaining portion pass on to the end of the belt, either scraper can be set across the belt to any desired point, or angle, or to the central line thereof; if half of the material is desired on one side of the belt and half on the other, the ends of both scrapers, 47 and 57, will be brought substantially together at the center line of said belt.

The advantage of elevating the tripper above the conveyer belt is that it requires less room in the building for installation of the conveyer and unloading devices, than with other mechanisms having the same general object in view.

As a rule, the track rails for the carriage are on a level with the I-beams, and on the outside of the same, the tripper straddling the conveyer.

The mechanism described is simple in its construction, positive in its action and forms a convenient and satisfactory means for removing loose material at any point in the length of the conveyer while the latter is in operation, and the whole or any part of the material may be discharged, or removed, to either or both sides of the conveyer, or the material may be allowed to pass the unloading mechanism to the end of the conveyer, as circumstances may make desirable.

Having thus described my invention, what I claim as new and desire to secure by Letters Patent is,—

1. In an unloading mechanism, the combination with a belt conveyer and means for imparting thereto substantially a curved or trough-shape in cross section, of a movable scraper positioned above the belt, a frame suspended normally below the carrying-run of the belt, and means including a rack-bar fixed to said frame and a pinion engaging said bar, for raising the frame and carrying-run of the belt whereby the belt is straightened out transversely and its curved or trough-shape is changed to a plain flat surface for the scraper to operate over.

2. In an unloading mechanism, the combination with a belt-conveyer and a support for the carrying-run thereof, said support comprising means for uplifting the edges of the belt to thereby give the belt a curved form in cross-section, of means for elevating the belt out of engagement with said edge-uplifting means, and changing the cross-sectional form of said belt to substantially a level or flat surface, said elevating-means including a vertically-guided rack-bar and a pinion engaging said bar, and a scraper interposable in the range of action of the belt and adapted to direct the material laterally over the edge of the belt.

3. In an unloading mechanism the combination with a belt-conveyer and supporting means for the upper run thereof, of a track or guide above and substantially parallel with the belt, a carriage movably-mounted on said track or guide, a scraper turnably mounted on the carriage on an axis which is substantially at right-angles with the travel of said belt, and elevating-means supported on the carriage and adapted to lift the belt into the range of action of the scraper, said elevating means including a frame having members extending transversely below the lower side of the carrying portion of the belt, and vertically guided bars and actuating rotary members therefor.

4. In an unloading mechanism, the combination with a belt conveyer and supporting means for the upper run thereof, of a track or guide above and substantially parallel with the belt, a carriage movably-mounted on said track or guide, a scraper turnably mounted on the carriage on an axis which is substantially at right-angles with the travel of said belt, a roller frame beneath the upper run of the belt, and elevating means suspending said frame from the carriage and operable to lift the frame and cause it to lift the belt to straighten the latter out transversely, said elevating means also permitting the frame to be lifted above the plane of the belt supporting means to enable the frame to clear said supporting means when the carriage is moved from one point on the belt to another.

5. In an unloading mechanism, the combination with a belt conveyer and supporting rollers for the upper run thereof, certain of said rollers adapted to uplift the edges of the belt and thereby give the belt a curved form in cross-section, a track or guide above the belt, a carriage movably-mounted on said track or guide having a scraper at each side turnable in a horizontal plane across the range of travel of the material on the belt, whereby said material may be delivered to either, or both, sides of the belt, a roller-frame beneath the upper run of the belt, said carriage having rack-bars and actuating pinions for raising and lowering the roller-frame relative to the belt, and means for adjusting the position of the scrapers relative to the travel of the belt.

6. An unloading mechanism comprising the combination of a belt conveyer; means for normally giving the same a curved form in cross section; rails fixed above the plane of the carrying run of the belt; a carriage movably-mounted on said rails; a roller-carrying frame normally below the carrying-run of the belt and adapted to engage the same from below; elevating-means on the carriage connected to said frame and adapted to elevate and depress the latter; horizontally-turnable wing-scrapers mounted on the carriage at opposite sides of the belt; and means for adjusting the scrapers to cause them to deliver the whole or part of the material on either side of the belt, or a part on each side of said belt.

7. An unloading mechanism comprising the combination of a belt conveyer; means for normally giving the same a curved form in cross-section; rails fixed above the plane of the carrying-run of the belt; a carriage movably-mounted on said rails; a roller-carrying frame normally below the carrying run of the belt and adapted to engage the same from below; elevating-means on the carriage connected to said frame and adapted to elevate and depress the latter; horizontally-turnable wing-scrapers mounted on the carriage at opposite sides of the belt; and means for adjusting the scrapers to cause them to deliver the whole or part of the material on either side of the belt, or a part on each side of said belt, means for moving the carriage along its track or guide, and a track brake for fixing the carriage at any point along its track or guide.

In testimony whereof I have hereunto set my hand in presence of two subscribing witnesses.

WILLIAM R. CUNNINGHAM.

Witnesses:
G. McMICHAEL,
SAMUEL E. AUCK.